(12) United States Patent
Kalafala et al.

(10) Patent No.: US 9,710,594 B2
(45) Date of Patent: Jul. 18, 2017

(54) VARIATION-AWARE TIMING ANALYSIS USING WAVEFORM CONSTRUCTION

(71) Applicant: International Business Machines Corporation, Armonk, NY (US)

(72) Inventors: Kerim Kalafala, Rhinebeck, NY (US); SheshaShayee K. Raghunathan, Karnataka (IN); Debjit Sinha, Wappingers Falls, NY (US); Michael H. Wood, Hopewell Junction, NY (US); Vladimir Zolotov, Putnam Valley, NY (US)

(73) Assignee: INTERNATIONAL BUSINESS MACHINES, Armonk, NY (US)

( * ) Notice: Subject to any disclaimer, the term of this patent is extended or adjusted under 35 U.S.C. 154(b) by 0 days.

(21) Appl. No.: 14/936,886

(22) Filed: Nov. 10, 2015

(65) Prior Publication Data
US 2017/0132353 A1    May 11, 2017

(51) Int. Cl.
*G06F 17/50* (2006.01)

(52) U.S. Cl.
CPC ...... *G06F 17/5081* (2013.01); *G06F 17/5031* (2013.01)

(58) Field of Classification Search
CPC ............. G06F 17/5031; G06F 17/5059; G06F 17/5081
USPC .......................................... 716/108, 113, 134
See application file for complete search history.

(56) References Cited

U.S. PATENT DOCUMENTS

| | | | |
|---|---|---|---|
| 6,405,348 B1 * | 6/2002 | Fallah-Tehrani | G06F 17/5031 716/113 |
| 7,802,214 B2 | 9/2010 | Bargfrede et al. | |
| 7,814,448 B2 | 10/2010 | Abbaspour et al. | |
| 8,375,343 B1 | 2/2013 | Tiwary et al. | |
| 8,601,420 B1 | 12/2013 | Keller et al. | |
| 8,782,583 B1 | 7/2014 | Tiwary et al. | |
| 8,924,905 B1 | 12/2014 | Keller et al. | |
| 2006/0200784 A1 | 9/2006 | Ding et al. | |
| 2009/0193373 A1 | 7/2009 | Abbaspour et al. | |

(Continued)

OTHER PUBLICATIONS

Croix et al., "Blade and Razor: Cell and Interconnect Delay Analysis Using Current-Based Models", DAC, Jun. 2-6, 2003, pp. 386-389.

(Continued)

*Primary Examiner* — Paul Dinh
(74) *Attorney, Agent, or Firm* — Cantor Colburn LLP; Steven Meyers (57) ABSTRACT

A method of performing variation aware timing analysis for an integrated circuit, a system, and a computer program product are described. The method includes determining one or more voltage waveforms at an output of a first component of the integrated circuit based on respective one or more first processing conditions, and storing waveform information based on the one or more voltage waveforms. The method also includes obtaining an input voltage waveform at an input of a second component of the integrated circuit for a second processing condition based on processing the waveform information, the output of the first component being the input of the second component, and performing the variation aware timing analysis for the second component based on the input voltage waveform.

18 Claims, 7 Drawing Sheets

(56) References Cited

U.S. PATENT DOCUMENTS

| | | | |
|---|---|---|---|
| 2009/0306953 A1* | 12/2009 | Liu | G06F 17/5036 703/14 |
| 2011/0276933 A1* | 11/2011 | Banerji | G06F 17/5031 716/108 |
| 2012/0245904 A1 | 9/2012 | Abbaspour et al. | |
| 2014/0096099 A1* | 4/2014 | Phillips | G06F 17/5036 716/113 |

OTHER PUBLICATIONS

Fatemi et al., "Statistical Logic Cell Delay Analysis Using a Current-based Model", DAC, Jul. 24-28, 2006, pp. 1-5.

Feldmann et al., "Driver Waveform Computation for Timing Analysis with Multiple Voltage Threshold Driver Models", DAC, Jun. 8-13, 2008, pp. 425-428.

Goel et al., "Statistical Waveform and Current Source Based Standard Cell Models for Accurate Timing Analysis", DAC, Jun. 8-13, 2008, pp. 227-230.

Hashimoto et al., "Equivalent Waveform Propagation for Static Timing Analysis", IEEE Transactions on Computer-Aided Design of Integrated Circuits and Systems, vol. 23, No. 4, Apr. 2004, pp. 498-508.

Hatami et al., "Efficient Compression and Handling of Current Source Model Library Waveforms", Design, Automation & Test in Europe Conference & Exhibition, Apr. 20-24, 2009, pp. 1-6.

Jain et al., "Accurate Delay Computation for Noisy Waveform Shapes", IEEE, 2005, pp. 947-953.

Knoth, Christoph "Accurate Waveform-based Timing Analysis with Systematic Current Source Models", Doctoral Dissertation, 2012, pp. 1-132.

Liu et al., "Statistical Gate Level Simulation via Voltage Controlled Current Source Models", IEEE, 2006, pp. 23-27.

Tiwary et al., "WAVSTAN: Waveform based Variational Static Timing Analysis", Design, Automation & Test in Europe Conference & Exhibition, Apr. 16-20, 2007, pp. 1-6.

Zolotov et al., "Compact Modeling of Variational Waveforms", IEEE, 2007, pp. 705-712.

* cited by examiner

VARIATION-AWARE TIMING ANALYSIS USING WAVEFORM CONSTRUCTION

BACKGROUND

The present invention relates to timing analysis in integrated circuit design, and more specifically, to variation-aware timing analysis using waveform construction.

In the design of integrated circuits (ICs) or chips, static timing analysis (STA) is used to determine whether the timing specifications of the chip are satisfied prior to manufacturing. Results of STA drive automated or manual optimization of the chip design in an iterative fashion until all timing specifications are met. STA typically includes performing delay calculation, which involves modeling and calculating path delays for the gates and interconnects of the design, and propagation of arrival times, required arrival times, slews, and slacks for the paths in the design. Specifically, paths in the chip (e.g., from a chip input to a chip output) are analyzed to determine the speed of propagation through the paths and distinguish relatively fast and slow paths. This analysis may be used in the physical synthesis process following which a physical implementation of the chip is generated.

SUMMARY

Embodiments include a method, system, and computer program product to perform variation aware timing analysis for an integrated circuit. Aspects include determining one or more voltage waveforms at an output of a first component of the integrated circuit based on respective one or more first processing conditions; storing waveform information based on the one or more voltage waveforms; and obtaining an input voltage waveform at an input of a second component of the integrated circuit for a second processing condition based on processing the waveform information, the output of the first component being the input of the second component.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, timing analysis is an important part of ensuring that the physical implementation of a chip meets the design specifications. As also noted above, paths within a chip are analyzed with respect to timing to ultimately fix the paths that do not meet requirements.

As part of timing analysis, a chip design is modeled as a timing graph wherein gate- and wire-pins in the design are denoted by timing nodes in the graph. Each gate (or wire) input pin to an output pin connection is denoted by a directed timing edge in the graph. The input pin is called the source node of that edge, and the output pin corresponding to the connection that the edge denotes is called the sink node of the edge. Signals propagate from source to sink nodes along an edge. One parameter needed to determine timing of a path is arrival time. The arrival time at any timing node in the graph denotes the time when an electrical voltage signal arrives at that node. The arrival time for each primary input node of the design is asserted. In other words, for each primary input node of the timing graph (where primary input nodes have no incoming timing edges), an arrival time is provided as an assertion by the chip designer. The arrival time at the sink node of any edge is simply computed as the sum of the arrival time at the source node of that edge and the edge delay. The edge delay denotes the time it takes for a voltage signal to propagate from the input of that edge to the output. If an edge corresponds to a gate, the edge delay may be referred to as gate-delay. Similarly, if an edge corresponds to a wire or interconnect in the real chip design, the edge delay may be referred to as wire-delay. Gate and wire timing models compute these edge delays based on the input voltage signal characteristics, the gate or wire characteristics itself, as well as the characteristics of the subsequent gate or wire (those connected to the sink node of the edge). This calculation additionally produces a representation of an electrical voltage signal at the output of the edge.

A path in the design can essentially be represented by a chain of edges. Given a node 'N' with multiple incoming paths (multiple edges exist in the timing graph with a common sink node 'N') the arrival time at 'N' may be computed as the worst arrival time across all its incoming paths.

From an electrical signal perspective, a voltage signal at a node denotes a change in the voltage value, also termed switching. As an example, a signal at a node may denote a change in voltage from 0 to the highest voltage V. This is typically termed a rising signal. Similarly a falling signal denotes a change in voltage from the highest value V to 0. The transition of this signal between two values (0 to V or V to 0) is not instantaneous and is quantified by a "transition time" of that signal. A signal that takes a longer time to change its value would have a larger transition time than a faster changing signal. Typically, the signal is determined to have arrived at a node when the voltage at the node is half of the highest voltage, V (i.e., arrival time is the time when voltage is 0.5*V). To quantify the transition time of the signal, another parameter called the slew is used, which is the time it takes for the voltage at a given point to increase from a low threshold voltage to a high threshold voltage (e.g., from 0.1*V to 0.9*V).

Figure 1:
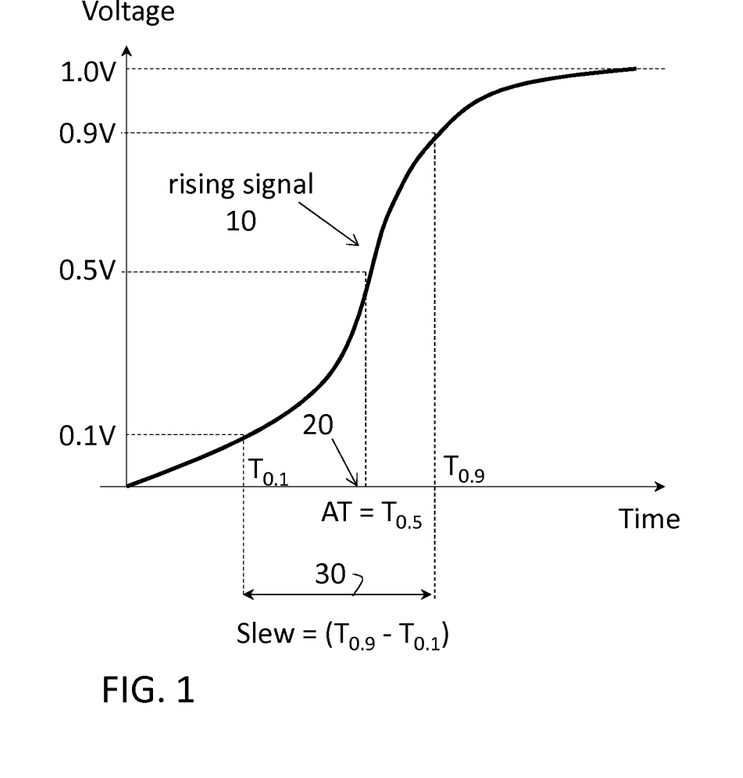
FIG. 1 shows one exemplary rising signal.

FIG. 1 shows an exemplary rising signal 10. Time is shown on one axis, and voltage is shown on another axis, as indicated. The arrival time (AT) 20 of the signal is given by the actual time value $T_{0.5}$ when the signal reaches 0.5*V. The slew 30, however, does not denote an actual time value but, instead, the difference of the time values between the signal crossing the upper and lower threshold (0.9*V and 0.1*V as an example). The slew 30 is thus given by $(T_{0.9V}-T_{0.1V})$. The arrival time 20 and the slew 30 together provide an indication of the voltage waveform shape.

Figure 2:
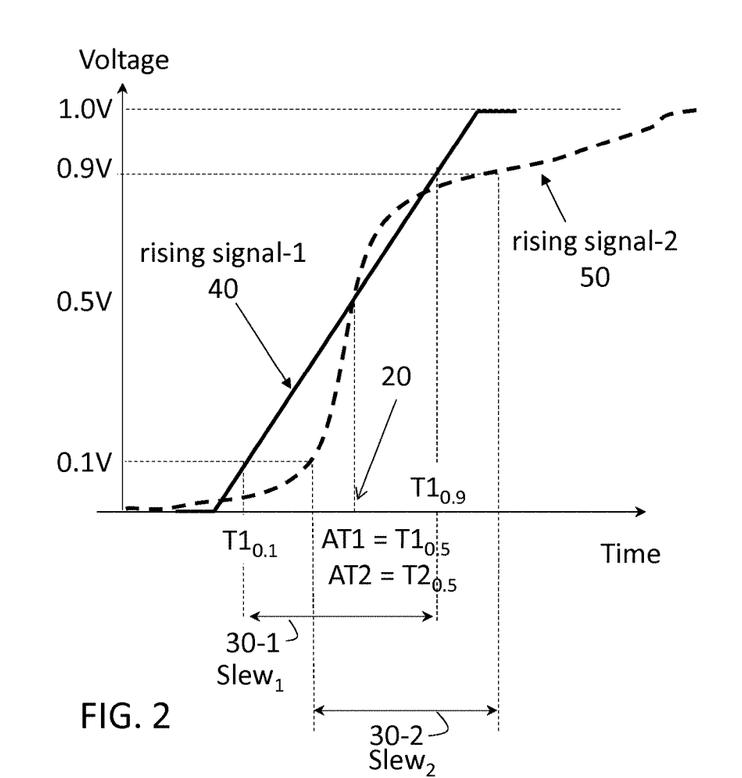
FIG. 2 shows two exemplary rising signals.

FIG. 2 shows two different exemplary rising signals, rising signal-1 40 and rising signal-2 50. FIG. 2 illustrates that the arrival time 20 and slew 30 are minimalistic representations of the actual voltage signal or waveform. In exemplary FIG. 2, rising signal-1 40 and rising signal-2 50 have the same arrival time 20. In addition, these two signals have slews identical to that of the exemplary rising signal 10 in FIG. 1, that is, slew 30-1=slew 30-2=slew 30. Yet, FIGS. 1 and 2 show that each of the rising signals 10, 40, 50 have a very different shape. Thus, only arrival time and slew are clearly incapable of representing the actual signal shape or waveform shape. For simplicity, given just an arrival time and slew, the waveform shape is often assumed to be a linear or ramp shape as the exemplary rising signal 40 in FIG. 2.

As mentioned previously, the delay of an edge is a function of the voltage signal at the input. Thus, considering an edge that denotes a wire in a chip design, for example, the delay across the wire would be different given the two input signals (rising signal 40 and rising signal 50) shown in FIG. 2. The same may apply for the delay of a gate edge with different signals at the input even though the signals have identical arrival times and slews. Consequently, modern and accurate static timing analysis requires retention of the waveform shape in addition to just the arrival time and slew parameter of a signal. The waveform shape may be stored as a piece-wise linear model or by the use of other mathematical shape metrics like skew, etc. An exemplary technique, called current source modelling, models a gate for STA and provides an accurate representation of the voltage waveform at the output of the gate in addition to providing delay and slew. While the slew still provides only the transition time information of the signal, the waveform shape is used for delay computation of the subsequent stage (e.g. the wire connected to the output of the gate) for accurate wire delay calculation as well as accurate wire output signal waveform calculation. In general, storing the waveform helps improve STA accuracy, but at the cost of higher memory consumption during STA analysis by a computer due to the overhead of storing waveforms for each node in the timing graph in addition to the arrival time and slew. It should be noted that while arrival times and slews are numbers, a waveform may be represented as a sequence of numbers denoting pairs of voltage values and signal times corresponding to those voltage crossings (e.g. $\{(0.1V, T_{0.1}), (0.2V, T_{0.2}), \ldots (0.9V, T_{0.9})\}$). Naturally, waveform storage is much more than just an incremental memory overhead to storing arrival times, and slews.

Variability in the chip manufacturing process and the impact of environmental variations are significant for modern chip designs. Manufacturing process variation (also termed Process variation) is the naturally occurring variation in the attributes of transistors (length, widths, oxide thickness) and wire interconnects (length, width) when integrated circuits are fabricated due to the nanometer scale sizes of these components. It becomes particularly important at smaller process technologies (<65 nanometers) as the variation becomes a larger percentage of the full length or width of the device and as feature sizes approach the fundamental dimensions such as the size of atoms and the wavelength of usable light for patterning lithography masks. Process variation causes measurable and predictable variance in the performance of chip designs. In addition, environmental variations including operating voltage- and ambient temperature-changes impact chip performance significantly. It is imperative that a chip functions correctly across this space of variation or variability. As an example, a chip should operate correctly at low voltage (e.g. low battery for a mobile device) as well as across high and low ambient temperatures (e.g. extreme hot and cold weather conditions when using a mobile device). Similarly, the chip should function irrespective of the amount of acceptable manufacturing process variations that may alter certain physical attributes of the chip components.

Variation aware STA is naturally critical to ensure the chip timing specifications are met given uncertainties from the aforementioned sources of variation. A specific condition for each given source of variation defines a corner of variation. If each source of variation has a low and high extreme value, there would be at least $2^K$ corners corresponding to K sources of variation wherein each source of variation is at an extreme value. Variation aware STA is also termed variable timing analysis, and is usually performed in one of two ways: (1) statistical static timing analysis (SSTA) wherein each delay, arrival time, slew, etc. is represented by a random variable with a distribution denoting that each of these values is not a single number but a range of values due to different conditions of variability, or (2) multi corner timing analysis, wherein STA is performed at multiple corners of variation to ensure the timing specification is met at each corner. Both these approaches require delay and output waveform computation for each edge across multiple corners since the former basically converts the information obtained from multiple corners into a range or distribution and propagates it instead of propagating corner specific values as done in the latter method.

It is not required that all $2^K$ corners be analyzed by either approach since this leads to corner explosion (given more than 15 sources of variation for typical chip designs). However, for ensuring robust chip design, a large number of corners are analyzed by each method (often in hundreds).

In a variation aware STA paradigm, memory consumption for STA analysis increases linearly with the number of corners analyzed. For large micro-processor designs with several billions of transistors, the memory consumption for STA may be prohibitive if accurate STA is performed while preserving voltage waveform shape information as mentioned previously. To alleviate the high memory consumption, variation aware STA may be performed without storing waveform shape but results in less accurate STA. Embodiments of the systems and methods detailed herein relate to storing the voltage waveform for only a subset of corners (e.g., one corner) in consideration of the storage issue and obtaining the voltage waveform for other corners dynamically based on processing (e.g., scaling, shifting) one or more of the stored voltage waveforms.

Figure 3:
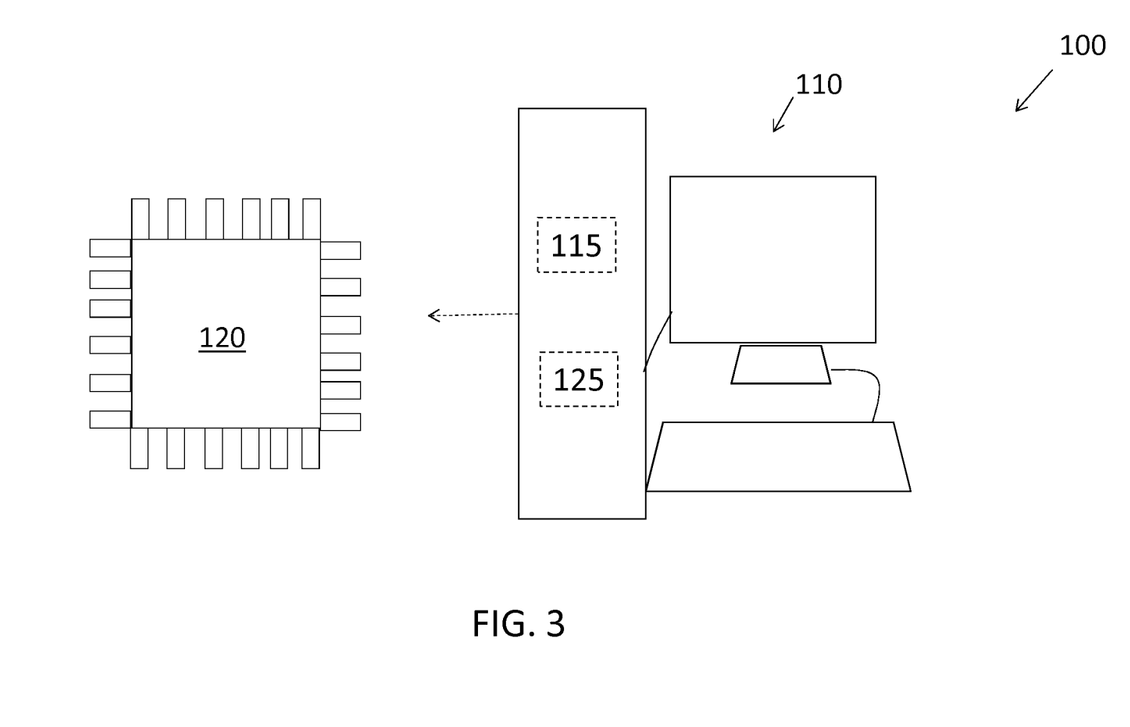
FIG. 3 is a block diagram of a system used to design a digital IC according to embodiments.

FIG. 3 is a block diagram of a system 100 according to embodiments of the invention. The system 100 includes a processing system 110 used to design an integrated circuit and the resulting physical implementation of the integrated circuit 120. The system 100 includes additional known components that perform functions such as, for example, obtaining measurements from the integrated circuit 120 that are provided to the processing system 110 as needed. The processing system 110 includes one or more memory devices 115 and one or more processors 125. The memory device 115 stores instructions implemented by the processor 125. As further discussed below, these instructions include processes used to perform the timing analysis and determination of voltage waveforms. According to the embodiments detailed below, the memory device 115 may additionally store the voltage waveforms and, specifically, the subset of voltage waveforms.

Figure 4:
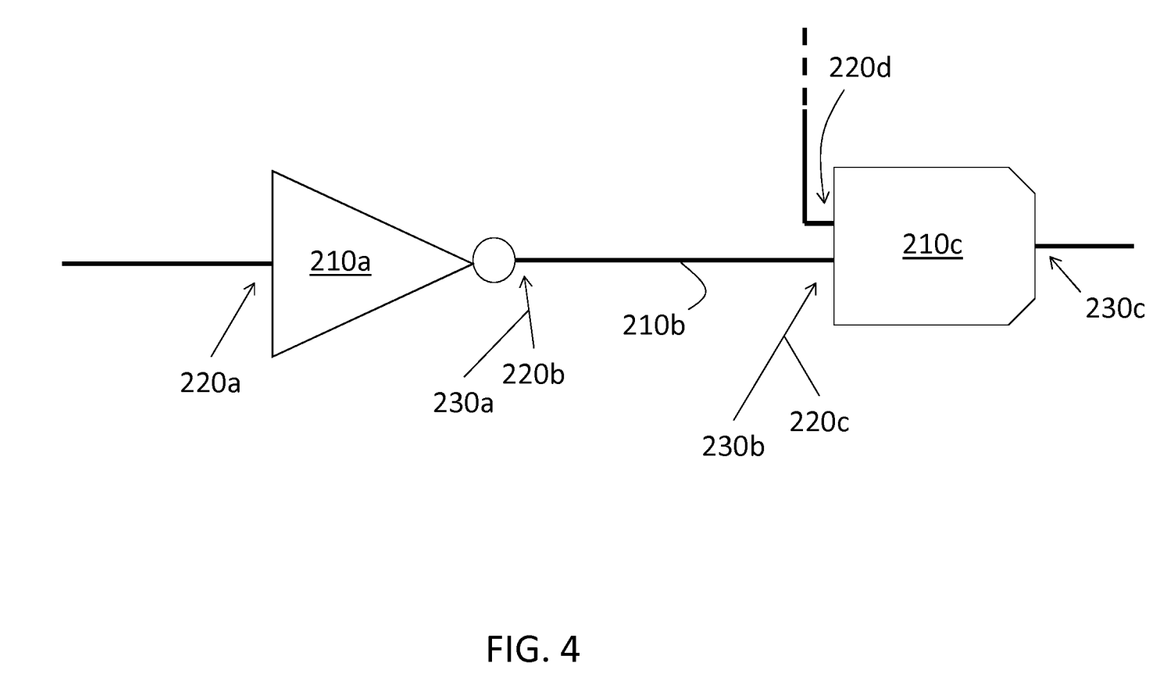
FIG. 4 illustrates exemplary components of an integrated circuit that is analyzed according to embodiments.

FIG. 4 illustrates exemplary components 210 of an integrated circuit 120 that is analyzed according to embodiments detailed herein. The exemplary components 210 include two gates 210a, 210c and a wire 210b. Each of these components 210 has an input 220 and an output 230. In the case of the second gate 210c, two inputs 220c, 220d are shown. Accordingly, two edges through the gate 210c (the edge from input 220c to output 230c and the edge from input 220d to output 230c) must be analyzed to determine the timing of each. Based on the arrangement of the exemplary components 210, the output 230a pin of the first gate 210a is also the input 220b of the wire 210b, and the output 230b of the wire 210b is also the input 220c of the second gate 210c. Thus, a more accurate voltage waveform at the output 230a of the first gate 210a (which is also the input 220b of the wire 210b) could be used to determine a more accurate delay through the wire 210b, for example. And, a more accurate voltage waveform at the output 230b of the wire 210b (which is also the input 220c of the gate 210c) could be used to determine a more accurate delay through the second gate 210c. Generally, by obtaining a more accurate representation of the voltage waveform (or shape) at the output 230 of a given component 210 (which is the input 220 of a subsequent component 210), a more accurate delay through the subsequent component 210 may be obtained. As noted above, obtaining the more accurate voltage waveform representation at outputs 230 of interest for every corner of interest is impractical from a storage standpoint. The embodiments detailed below address this issue by storing and process, as needed, only a subset of voltage waveforms at each output 230.

Figure 5:
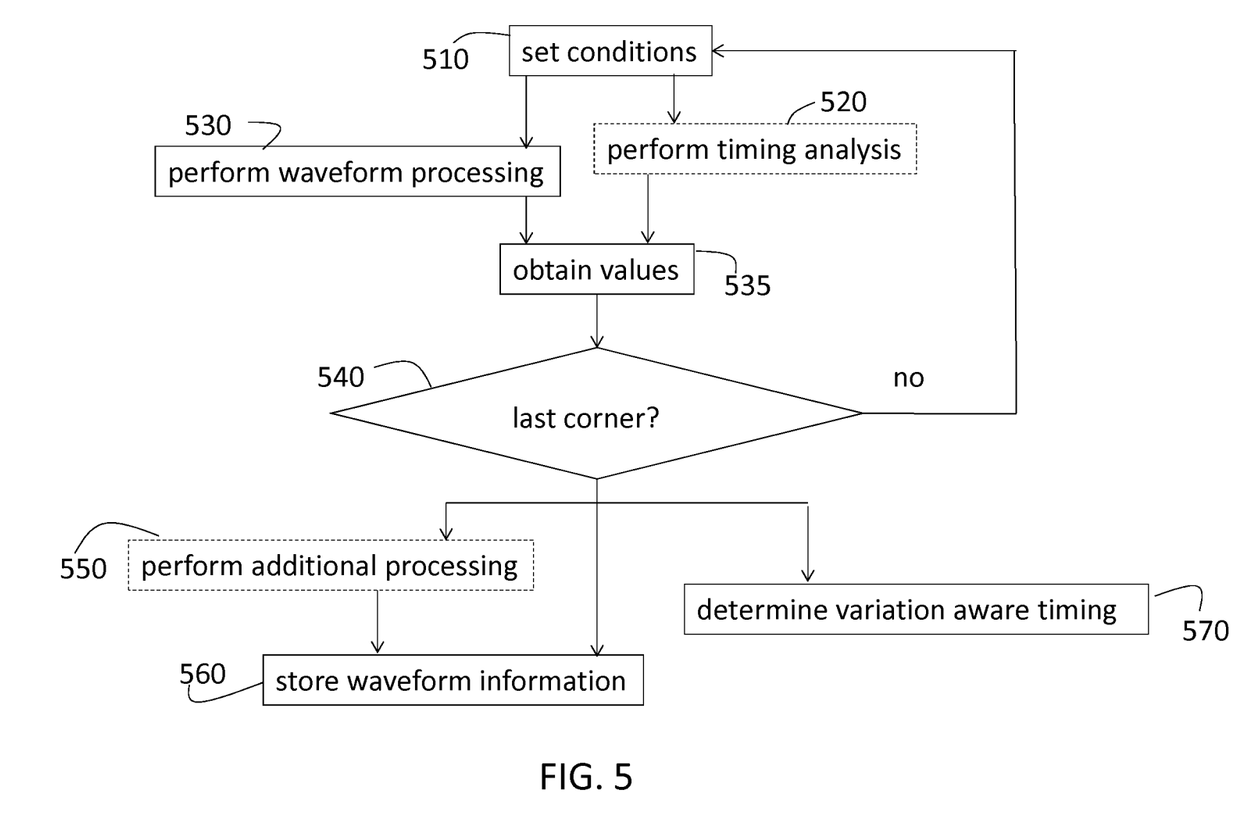
FIG. 5 is a process flow of a method of obtaining a subset of voltage waveforms according to embodiments.

FIG. 5 is a process flow of a method of obtaining a subset of voltage waveforms according to embodiments. As noted above, obtaining a more accurate voltage waveform at the output of one component results in a more accurate delay determination through the subsequent component. Thus, according to one embodiment, the processes shown in FIG. 5 are performed at the output of each component of interest to improve delay determination for respective subsequent components. For example, the processes shown in FIG. 5 may be performed for the gate 210a in FIG. 4, and the subset of voltage waveforms stored as a result of the processes may then be used in the determination of delay through the wire 210b as discussed with reference to FIG. 6.

At block 510, setting conditions includes defining temperature, chip operating voltage level, assigning manufacturing process sources of variations a specified corner each, and other parameters to establish one particular corner of variation. At block 520, performing timing analysis to obtain arrival time, slew, and delay for the given component at the given corner may be done conventionally (without an accurate voltage waveform at the input) or according to the processes shown in FIG. 6. Whether conventional timing analysis or the set of processes of FIG. 5 is performed may be based on whether an accurate voltage waveform is available at the input of the given component (for which the processes of FIG. 5 are performed). As indicated by FIG. 5, this process (at block 520) may not be performed for this particular corner at all. That is, according to different embodiments, the corners used to obtain the subset of voltage waveforms at the output of a component, according to the processes shown in FIG. 3, may be entirely different than or may partially overlap with the corners used to determine delay associated with that component.

Performing waveform processing, at block 530, includes implementing a CSM or another known technique to determine the output voltage waveform of the component for which the processes are being performed (e.g., the gate 210a in the exemplary circuit shown in FIG. 2). This step may also be performed as part of the optional timing analysis shown at block 520. Obtaining values at block 535 includes obtaining the voltage waveform (from block 530) and, optionally the arrival time, slew, and delay values (from block 520). At block 540, checking whether the last corner of interest is reached is performed to determine if other corners are also of interest. Based on the answer at block 540, the processes (510-535) are repeated, iteratively, for each of the corners of interest. In alternate embodiments, the check at block 540 may include processing of the previously obtained voltage waveforms. That is, the corners of interest may all be predefined or, based on processing of the already obtained voltage waveforms, additional corners may be dynamically selected.

At block 550, performing additional processing on the voltage waveforms obtained at the component output is optional, as indicated in FIG. 5. When more than one corner is considered, the additional processing at block 550 may be used to select a further subset of voltage waveforms. That is, the voltage waveforms obtained through the processes shown in FIG. 5 are already a subset of all the possible voltage waveforms (based on all the possible corners) at the output of the given component. At block 550, some criteria may be used to further narrow that subset of voltage waveforms. For example, the voltage waveforms for specific corners may be of interest based on the type of component (e.g., gate, type of gate, wire) or the mode (early or late) of timing constraints being considered. The voltage waveform(s) of interest may be selected dynamically. For example, a corner may be selected based on which corner resulted in the worst arrival time or slew. According to another embodiment, the voltage waveforms obtained (block 535) for multiple corners may be combined into a single or smaller number of voltage waveforms. In further alternate embodiments, the processing at block 550 may be to obtain a metric from the voltage waveforms. The metric may be skewness, for example, or another metric that denotes the shape of the voltage waveform. When processing is performed at block 550, storing waveform information, at block 560, refers to storing the output of that processing. Instead, the voltage waveforms obtained through the iterative process (blocks 510-540) may be stored directly at block 560. When the same corners used to obtain the subset of voltage waveforms at the output of a given component are also used to determine arrival time, delay, and slew at the output of the component (optional block 520 is processed), then determining variation aware timing, at block 570, includes performing variation aware timing analysis for the component using, for example, statistical static timing analysis or multi-corner static timing analysis with the values obtained at block 520. At block 570, a statistical static timing analysis flow would convert the obtained delays, slews, and arrival times across multiple corners into a statistical delay, a statistical slew, and a statistical arrival time, respectively. A multi-corner static timing analysis flow would instead keep these values as a set of values corresponding to each corner.

When more than one edge terminates at a given node I (two component outputs are at the input of the component of interest), the processes shown in FIG. 5 would be performed for each edge and the waveforms obtained for each would be combined to store a single set of waveforms for that node I. That is, for example, given a two input gate like 210c shown in FIG. 2, the waveforms obtained (using the processes shown in FIG. 5) at the output of the gate (from the two incoming edges, each corresponding to an input) would be combined and stored. The combined set of waveforms (which is a subset of all possible waveforms based on all possible corners) would then be used according to the processes discussed below with reference to FIG. 6.

Figure 6:
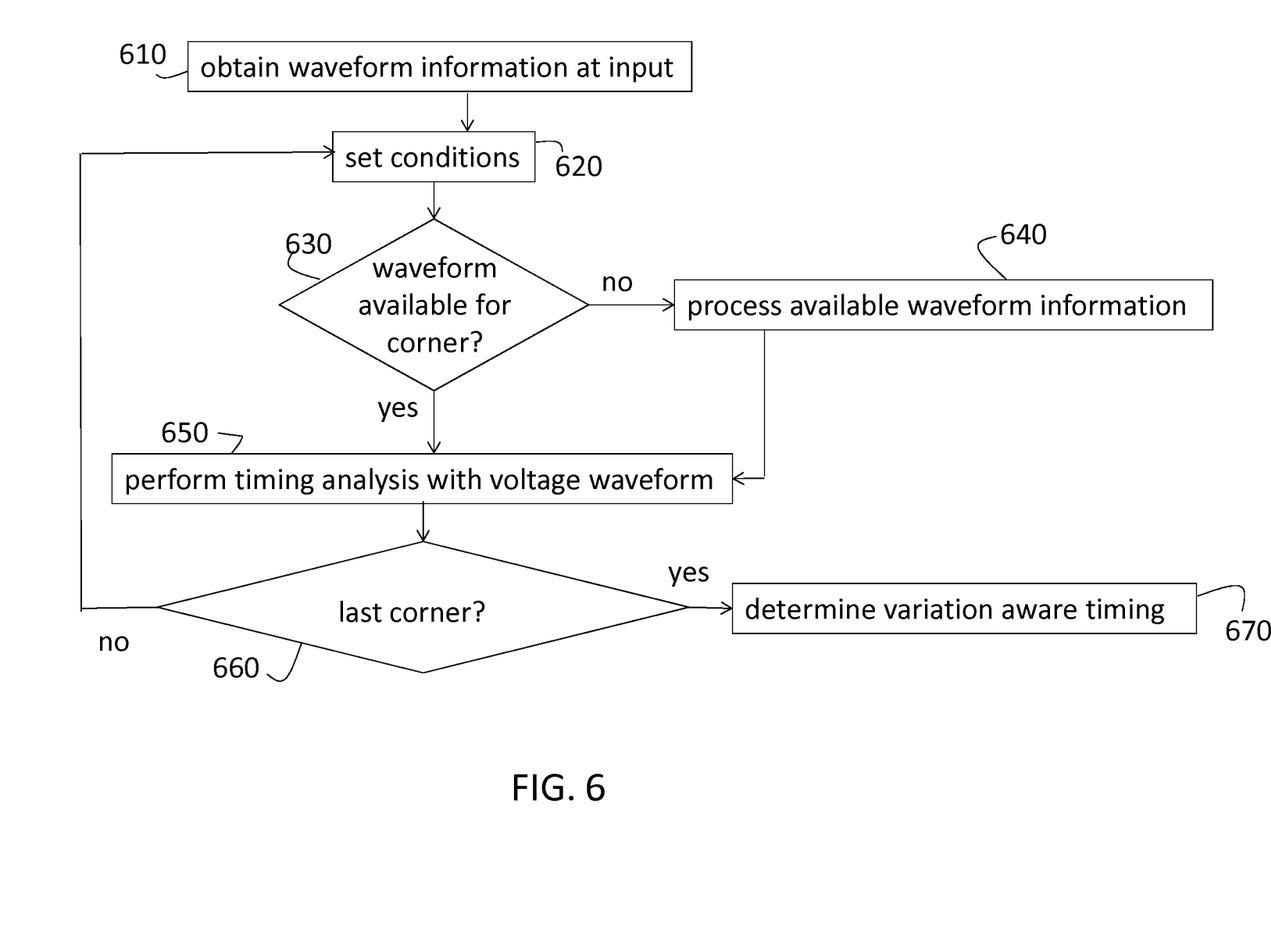
FIG. 6 is a process flow of the method of performing variation-aware timing analysis using waveform construction according to embodiments.

FIG. 6 is a process flow of the method of performing variation-aware timing analysis using waveform construction according to embodiments. At block 610, obtaining waveform information at the input of the component of interest refers to obtaining the waveform information generated, according to the processes shown in FIG. 5, at the output of the preceding component. Referring again to the exemplary components shown in FIG. 4, the processes shown in FIG. 6 would be performed for the wire 210b when the waveform information is generated for the gate 210a according to the processes shown in FIG. 5. At block 620, setting conditions refers to setting a corner of interest. Checking, at block 630, if the voltage waveform is available for the given corner refers to determining if the processes at FIG. 5 resulted in storing a voltage waveform (at the output of the component immediately preceding the component of interest with respect to FIG. 6) for the specific corner selected at block 620. For example, when the result of the processing at FIG. 5 (for the component immediately preceding the component of interest) is a voltage waveform metric or a composite waveform, then the specific voltage waveform relating to the corner set at block 620 would not be available. When this is the case, processing available waveform information, at block 640, is necessary to construct the voltage waveform of interest (i.e., the voltage waveform at the input of the component of interest (obtained at the output of the immediately preceding component) at the corner of interest). The processing, at block 640, is further detailed below.

Whether the specific voltage waveform of interest (at the input of the component of interest at the corner of interest) if available (stored) or constructed (per block 640), performing timing analysis with the voltage waveform for the corner set at block 620 is implemented at block 650. As noted above, this timing analysis results in a more accurate delay determination based on the more accurate input voltage waveform (as opposed to just slew values and thereby a default (e.g., ramp) waveform shape assumption). The processes (620-650) are repeated iteratively, based on checking for the last corner of interest at block 660.

At block 670, determining variation aware timing based on determining the arrival time, slew, and delay for the component of interest at each corner of interest (at block 650) includes performing statistical static timing analysis or multi-corner static timing analysis, for example. To be clear, the arrival time and slew at the input of the component of interest must be available for the given corner. This is one of the reasons that the timing analysis at block 520 (FIG. 5) is optional. That is, the arrival time and slew at the output of the component immediately preceding the component of interest (i.e., at the input of the component of interest) must be available for every corner at which delay must be determined for the component of interest. This information is also used in the processing at block 640, as discussed below. However, the voltage waveform need not be saved for all those same corners of interest but, instead, may be constructed (at block 640) based on saved waveform information (per the processes of FIG. 5). This approach may result in significant savings in memory usage, because storing arrival time and slew values for every corner of interest requires very little memory as compared to storing voltage waveform for every corner of interest.

Returning to the processing at block 640, the waveform information stored (according to processes shown in FIG. 5) for the output of the component immediately preceding the component of interest is processed to obtain the voltage waveform for the corner of interest (according to block 620). This voltage waveform at the output of the component immediately preceding the component of interest is the voltage waveform at the input of the component of interest (e.g., the voltage waveform at the output of gate 210a is the voltage waveform at the input of wire 210b in FIG. 4 and may be used to determine delay through wire 210b). The processing of waveform information to obtain the voltage waveform for a particular corner, at block 640, depends on the type of waveform information that is stored. For example, processing performed on metrics that are stored to denote the shape of the voltage waveforms from which they stem are processed differently than a waveform.

Generally, scaling and shifting of the stored waveform or waveforms is performed to match the arrival time and slew associated with the corner of interest. When metrics are stored, the associated waveform is first recovered prior to the scaling and shifting. This scaling need not be linear, because linear scaling assumes a greater similarity in the shapes of the desired and stored voltage waveforms. Timing points $T_s(V)$ of the scaled waveform may be computed according to:

$$T_s(V)=T_B(V)*F(V) \qquad [\text{EQ. 1}]$$

In EQ. 1, V is the voltage value at the time point, $T_B(V)$ is the time of the base waveform (stored or generated based on the processes of FIG. 5) at voltage V, and F(V) is the value of the scaling factor at voltage V. For linear scaling, F(V) is a constant.

Figure 7:
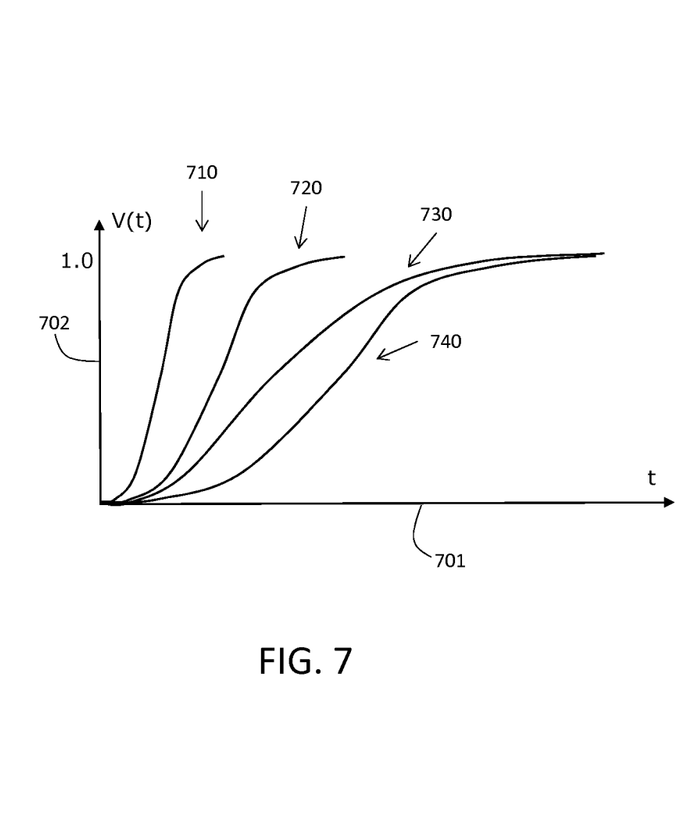
FIG. 7 illustrates linear and non-linear scaling for an exemplary base waveform according to embodiments.
Figure 8:
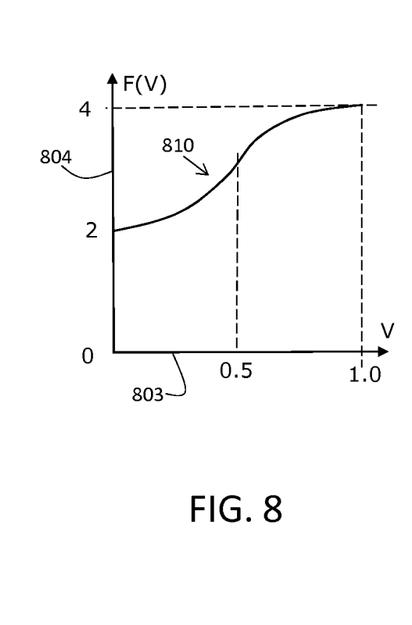
FIG. 8 shows an exemplary scaling factor F(V) according to an embodiment.

FIG. 7 graphically illustrates linear and non-linear scaling for an exemplary base waveform 710 according to embodiments. The waveforms 710, 720, 730, 740 are shown with time along axis 701 and voltage along axis 702. The linearly scaled waveforms 720 and 730 are scaled by a factor of 2 and 4, respectively, and the non-linearly scaled waveform 740 is scaled according to the scaling factor, F(V), shown in FIG. 8. F(V) 810 is shown with voltage along axis 803 and the scaling factor along axis 804. For a non-monotone waveform, the scaling factor, F(V), may be different for each interval of monotony.

An example of the processing at block 640 includes the construction of a waveform at the input of an edge (for which timing analysis is desired) at a given corner wherein the slew is S. The slew of the stored base waveform (from which the waveform of interest will be constructed) is $S_B$. Given a stored waveform, its slew may be computed as the difference of the high and low threshold points, e.g. $S_B = \{T_B(0.9V) - T_B(0.1V)\}$. Thus, the slew of a stored waveform need not be explicitly stored. An exemplary scaling factor of $(S/S_B)$ may be used. Consequently, each time point of the base waveform is scaled by this factor to obtain the desired waveform. Thus, the time points of the waveform of interest may be computed as indicated by Table 1.

TABLE 1

Exemplary waveform values based on scaling base waveform values.
time points of desired waveform with scaling $T(0.1 \text{ V}) = (S/S_B) * T_B(0.1 \text{ V})$
$T(0.2 \text{ V}) = (S/S_B) * T_B(0.2 \text{ V})$
.
.
.
$T(0.5 \text{ V}) = (S/S_B) * T_B(0.5 \text{ V})$
.

TABLE 1-continued

Exemplary waveform values based on scaling
base waveform values.
time points of desired waveform with scaling

.
.
.

T(1.0 V) = (S/S$_B$) * T$_B$(1.0 V)

Given the definition of slew as the difference of voltage crossing between the high and low thresholds, the slew for the desired waveform is {T(0.9V)−T(0.1V)} which, based on the scaling factor (S/S$_B$) is given by (S/S$_B$)*{T$_B$(0.9V)−T$_B$(0.1V)}. Because S$_B$={T$_B$(0.9V)−T$_B$(0.1V)}, the desired waveform's slew indeed matches the desired value S. The waveform may optionally be shifted to match the arrival time at the desired corner. The arrival time (AT) of the stored base waveform is AT$_B$, and the arrival time at the given corner is AT. By definition, AT$_B$=T$_B$(0.5V). After scaling, as shown in Table 1 above, the arrival time of the scaled waveform is T(0.5V)=[(S/S$_B$)*T$_B$(0.5V)]. To shift the base waveform to match the corner's arrival time, each time point may be shifted by a constant value denoting the difference of the arrival times: {AT−[(S/S$_B$)*T$_B$(0.5V)]}. Mathematically, the combination of scaling and shifting would result in the time values for the desired waveform that are indicated in Table 2.

TABLE 2

Exemplary waveform values based on scaling and shifting
base waveform values.
time points of desired waveform based on scaling and shifting T(0.1 V) ={(S/S$_B$) * T$_B$(0.1 V)} + {AT − [(S/S$_B$) * T$_B$(0.5 V)]}
T(0.2 V) ={(S/S$_B$) * T$_B$(0.2 V)} + {AT − [(S/S$_B$) * T$_B$(0.5 V)]}
.
.
.
T(0.5 V) ={(S/S$_B$) * T$_B$(0.5 V)} + {AT − [(S/S$_B$) * T$_B$(0.5 V)]}
.
.
.
T(1.0 V) ={(S/S$_B$) * T$_B$(1.0 V)} + {AT − [(S/S$_B$) * T$_B$(0.5 V)]}

Based on the scaling and shifting, the arrival time, AT, of the constructed waveform or T(0.5V) is, therefore, {(S/S$_B$)*T$_B$(0.5V)}+{AT−[(S/S$_B$)*T$_B$(0.5V)]}, as indicated by Table 2 and is as desired. While the example above assumes that the base waveform is stored as a set of crossing points for voltages 0.1V, 0.2V . . . 1.0V, other time and voltage crossing points at other intervals may be stored instead and may be used to obtain other crossing points at different intervals.

Non-linear scaling may be implemented according to alternate embodiments, as well. The scaling function F(V) may be represented as:

$$F(V)=S_W*f(V) \quad [EQ. 2]$$

In EQ. 2, S$_W$ is a constant scaling factor specific for each waveform and corner, and f(V) is a nonlinear scaling function, which is the same for all waveforms and all corners. The scaling function, F(V), is constructed to minimize the maximum, average, or root square mean error. In alternate embodiments, different scaling functions, F(V), may be used for different corners, different types of components, rise and fall transitions, different cells, or different interconnects. In further embodiments, the scaling factor, F(V), may be given by:

$$F(V)=S_{W1}*f_1(V)+S_{W2}*f_2(V)+ \ldots +S_{SN}*f_N(V) \quad [EQ. 3]$$

In EQ. 3, constant scaling factors, S$_{W1}$, S$_{W2}$, . . . , S$_{WN}$ are specific to each waveform and corner, and nonlinear scaling functions, f$_1$(V), f$_2$(V), . . . , f$_N$(V) are the same for all waveforms and all corners of interest in the processing according to FIG. 6. A different embodiment involves series expansion of the scaling function such that:

$$F(V)=S_0+S_1*V+S_2*V^2+ \ldots +S_N*V^N \quad [EQ. 4]$$

In the simple case, scaling depends on the voltage linearly, and EQ. 4 simplifies to:

$$F(V)=S_0+S_1*V \quad [EQ. 5]$$

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of performing variation aware timing analysis for an integrated circuit, the method comprising:

determining, using a processor, one or more voltage waveforms at an output of a first component of the integrated circuit based on respective one or more first processing conditions;

storing, using a memory device, waveform information based on the one or more voltage waveforms;

obtaining, using the processor, an input voltage waveform at an input of a second component of the integrated circuit for a second processing condition based on the waveform information, wherein the output of the first component is the input of the second component, wherein the obtaining the input voltage waveform at the input of the second component for the second processing condition includes scaling and shifting the waveform information to match the arrival time and the slew at the input of the second component for the second processing condition; and performing the variation aware timing analysis for the second component based on the input voltage waveform, wherein manufacturing the integrated circuit is based on the variation aware timing analysis.

2. The computer-implemented method according to claim 1, wherein the performing the variation aware timing analysis includes performing statistical timing analysis or multi-corner timing analysis.

3. The computer-implemented method according to claim 1, wherein the storing the waveform information includes storing one or more of the one or more voltage waveforms.

4. The computer-implemented method according to claim 1, wherein the storing the waveform information includes storing a composite waveform generated from the one or more waveforms.

5. The computer-implemented method according to claim 1, wherein the storing the waveform information is based on the one or more first processing conditions.

6. The computer-implemented method according to claim 1, further comprising determining an arrival time and slew at the output of the first component for the second processing condition.

7. The computer-implemented method according to claim 1, wherein the scaling is based on a non-linear scaling function.

8. A system to perform variation aware timing analysis for an integrated circuit, the system comprising:

a memory device configured to store waveform information based on one or more voltage waveforms; and a processor configured to determine the one or more voltage waveforms at an output of a first component of the integrated circuit based on respective one or more first processing conditions, obtain an input voltage waveform at an input of a second component of the integrated circuit for a second processing condition based on processing the waveform information, the output of the first component being the input of the second component, and perform the variation aware timing analysis for the second component based on the input voltage waveform, wherein the processor determines the input voltage waveform at the input of the second component at the second processing condition based on scaling and shifting the waveform information to match the arrival time and the slew at the input of the second component at the second processing condition and the variation aware timing analysis is provided to manufacture the integrated circuit.

9. The system according to claim 8, wherein the processor stores one or more of the one or more voltage waveforms as the waveform information.

10. The system according to claim 8, wherein the processor generates a composite waveform from the one or more voltage waveforms as the waveform information.

11. The system according to claim 8, wherein the processor determines the waveform information from the one or more voltage waveforms based on the corresponding one or more processing conditions.

12. The system according to claim 8, wherein the processor determines an arrival time and slew at the output of the first component, which is the input of the second component, at the second processing condition.

13. The system according to claim 8, wherein the processor scales the waveform information based on a non-linear scaling function.

14. A computer program product for performing variation aware timing analysis for an integrated circuit, the computer program product comprising a computer readable storage medium having program instructions embodied therewith, the program instructions executable by a processor to perform a method comprising:

determining one or more voltage waveforms at an output of a first component of the integrated circuit based on respective one or more first processing conditions;

storing waveform information based on the one or more voltage waveforms;

obtaining an input voltage waveform at an input of a second component of the integrated circuit for a second processing condition based on processing the waveform information, the output of the first component being the input of the second component, wherein the obtaining the input voltage waveform at the input of the second component at the second processing condition includes scaling and shifting the waveform information to match the arrival time and the slew at the input of the second component at the second processing condition; and performing the variation aware timing analysis for the second component based on the input voltage waveform, wherein manufacturing the integrated circuit is based on the variation aware timing analysis.

15. The computer program product according to claim 14, wherein the storing the waveform information includes storing one or more of the one or more voltage waveforms or storing a composite waveform generated from the one or more waveforms.

16. The computer program product according to claim 14, wherein the storing the waveform information is based on the one or more first processing conditions.

17. The computer program product according to claim 14, further comprising determining an arrival time and slew at the output of the first component, which is the input of the second component, at the second processing condition.

18. The computer program product according to claim 17, wherein the scaling is based on a non-linear scaling function.

* * * * *